US006655062B1

(12) United States Patent
Meeker

(10) Patent No.: US 6,655,062 B1
(45) Date of Patent: Dec. 2, 2003

(54) MODULAR SIGN SYSTEM

(76) Inventor: Donald T. Meeker, 22 Rockwood Dr., Larchmont, NY (US) 10538

( * ) Notice: Subject to any disclaimer, the term of this patent is extended or adjusted under 35 U.S.C. 154(b) by 0 days.

(21) Appl. No.: 09/130,067

(22) Filed: Aug. 7, 1998

(51) Int. Cl.[7] ............................ G06F 15/00; G06F 7/02
(52) U.S. Cl. ............................................ 40/606; 40/611
(58) Field of Search ........................... 40/606, 611, 618, 40/649

(56) References Cited

U.S. PATENT DOCUMENTS 3,102,351 A * 9/1963 Howell ........................ 40/734
3,643,362 A * 2/1972 Hackett et al. ............... 40/611
4,693,026 A * 9/1987 Callahan et al. .............. 40/618

* cited by examiner

*Primary Examiner*—Cassandra H. Davis
(74) *Attorney, Agent, or Firm*—Cohen, Pontani, Lieberman & Pavane

(57) ABSTRACT

A sign system according to the invention includes an upper rail and a lower rail interconnecting two vertical uprights. The upper rail and the lower rail comprise confrontingly opposed longitudinal channels, each channel has a center section and two side sections on either side of the center section. A core plate having upper and lower edges is held between the upper rail and lower rail in the center section of the channels. The upper and lower edges are held in the center section of the channels by stops. Sign panels including the information to be displayed by the sign system are insertable into the side sections of the channels on one or both sides of the core plate.

40 Claims, 13 Drawing Sheets

MODULAR SIGN SYSTEM

BACKGROUND OF THE INVENTION

1. Field of the Invention

The invention relates to an architectural sign system for holding one or more sign panels between two horizontal retaining bars.

2. Description of the Related Art

Signs embody a wide variety of types and styles from letters incised into stone to signs containing extruded sign frames materials. Modern signs use refined coatings and are usually prepared using computer graphics. Architectural sign systems are required for identifying buildings and general areas, directing pedestrian and/or vehicular traffic, and for providing general information on and around building complexes, parks, and other architectural sites. In most cases, many signs are required to provide all the necessary information in and around a specific site. The necessary signs will have different sizes and each individual sign may require one or a plurality of sign panels. In addition, some signs may be one-sided and others may be double-sided. The logistics required for procuring all the necessary parts and stocking all the different types of parts may be difficult when each different type of sign requires different hardware. These signs must withstand all weather conditions and, depending on the location, must deter vandalism.

The use of a "systems" approach allows architects to specify a factory produced design for a signing project. The systems use component parts to create uniform structures that are integrated with a uniform approach to graphics. A large number of different types of architectural systems sign are known. These are complex signs which incorporate complex shapes and parts for both sign leg assembly and panel frame assembly.

Frames required for most architectural signs include complex extrusions which include a retainer for holding only one panel into a frame. As information changes, the entire panel must be replaced, not just a small portion of it. In addition, these frames must be designed as either a single-faced sign or a double-faced sign. Frequently, these types of signs are highly finished and susceptible to vandalism. This type of sign is typically used to display names of buildings or company logos which may be seen from a main road or other distant vantage point. An example of this type of sign is disclosed in U.S. Pat. No. 4,641,448.

Another example of prior art signs includes those having extruded uprights with a rigid box section connected on the vertical edge to the extruded uprights. An example of this type of sign panel is U.S. Pat. No. 4,802,296. The reference discloses a box section sign attached to extruded shape uprights. The uprights are bolted to a side of the box section. In this type of prior art design it is difficult to exchange the sign panel because a new box section must be installed. It is also difficult to make this a modular design.

Yet another type of prior art design include extrusions which serve as an attachment point to which the signs are mounted. Examples of these are U.S. Pat. No. 3,555,715, in which the extrusion is a projection which receives signs and U.S. Pat. No. 1,880,828 in which the extrusions are slots in which the signs are received.

SUMMARY OF THE INVENTION

It is an object of the present invention to provide a modular architectural sign system accommodating rows of sign panels, sign panels spanning an entire sign height, or both, which may be used as either a single-faced or double-faced sign without modifying the structure of the assembly, and which deters vandalism.

According to the present invention, an architectural sign system includes two laterally spaced substantially vertical supports. An upper rail having first and second ends and a lower rail having first and second ends are each connected between the two laterally spaced substantially vertical supports. The upper rail and the lower rail having confrontingly opposed longitudinal channels running between the first and second ends. Each of the channels has a longitudinal central portion and longitudinal side portions. Upper and lower edges of a substantially planar core piece are inserted in the central portions of the upper rail and the lower rail. The central portion of the channels has a greater depth than the side portions. The difference in depth forms stops between the central portion and the side portions which prevent the upper and lower edges of the core from moving into said side portions of said longitudinal channel. Each of the side channels is operable for receiving edges of sign panels, the architectural sign system thus accommodates sign on one of said first planar side, said second planar side, and both of the first, and second planar sides of the core piece.

The sign system according to the invention is supported by vertical uprights. Retaining rails are connected between the posts to hold sign panels. When more than one row of sign panels are required, a retaining bracket is used to separate and hold the two rows of side panels that are vertically adjacently arranged.

The vertical uprights may be inserted into the ground and may include stabilizers for securing the position of the vertical uprights. Other conventional devices and methods may be used for securing the vertical uprights into the ground. Instead of being supported in the ground, the vertical uprights may, be supported on a wall or other vertical support. In a further embodiment, the portion of the posts to which the sign panels are connected may be angled so that they directly face an intended viewer.

The sign system includes a core comprising a planar sheet of material of suitable stiffness which is held between the retaining rails. Each of the retaining rails has a longitudinal channel including a center portion and side portions along either side of the center portion. The center portion has a width w1 and a depth d1 and the side portions have widths w2 and depths d2. The upper and lower ends of the core are inserted into the center portion of the channel in retaining rails. The sides of the center portion form stops which prevent the ends of the core from entering the side portions of the channel. The sign panels are then inserted into the side portions of the retaining rails, and the retaining rails fixedly connected to the posts. Sign panels may span the full distance between the upper retaining rail and the lower retaining rail or two sign panels may be mounted, one above the other. When two vertically adjacent panels are mounted, the bottom end of the upper sign panel and the top end of the lower sign panel are held against the core by a center bracket. The-center bracket is fixedly held against one planar side of the core. The center bracket also has two side channels for holding the side panels. Each side channel has a depth d3 and a width w2.

More than two rows of sign panels may also be installed on one side of the core by installing one of the center brackets between each pair of vertically adjacent rows. In addition, the rows separated by the bracket do not have to extend the entire length between the posts.

Since the core is held in the center portion of the channel, the same rails and core may be used in signs requiring a sign panel on only one side of the core or in signs requiring sign panels on both sides of the core.

The stops for holding the core in the center of the channel may include barriers, which partition the channel into three separate and discrete portions. In addition, the stops may also comprise an edge piece connected along an edge of the core to be inserted in the channel. The edge piece the end of the core that is inserted into the channel has the same width $W_T$ as the channel. The depth $d_e$ of the edge piece is less than the depth $d_c$ of the channel. Therefore, in this embodiment, the side channels are formed between the core and the sides of the channel.

In some cases, where a very large sign area is required, a center retaining rail may be used to connect two cores. The center retaining rail is connected between the two vertical uprights similarly to the retaining rails. The center retaining rail holds the bottom of an upper core and the top of a lower core, thereby providing an additional central support for the large sign. Multiple sign panels may be arranged on each of the upper and lower cores as described above.

In general, the present invention is a sign system for identification, wayfinding and information sign programs for parks, campuses and other public places. The sign according to the present invention enables the placement of a variety of sign functions within a common, durable, and affordable structural system. The inventive sign system accommodates single or double face assemblies with the same structural components. The panel assemblies may be ground mounted, attached to a vertical surface or suspended. Using the retaining rails and brackets, a single panel or a group of modular panels may be placed on each face. Modular panels may be grouped horizontalty in rows, vertically in columns, or both. The panels inserted in the assembly may comprise a variety of graphical materials including porcelain enamel on steel, adhesive cut, or screen printed vinyl on aluminum, embedment fiberglass, etched or engraved metal or plastic, or any other material with rigidity and thickness similar to those listed. To resist vandalism, all connections may be concealed or use tamper resistant connections. The basic structure has been engineered for stiffness and durability. A limited number of parts, shapes and connections ensures simple maintenance. The sign system may also be based on principles of sustainable design which uses structural components designs to be recyclable or reusable as configurations change.

The various features of novelty which characterize the present invention are pointed out with particularity in the claims annexed to and forming a part of the disclosure. For a better understanding of the present invention, its operating advantages, and specific objects attained by its use, reference should be had to the drawings and descriptive matter in which there are illustrated and described preferred embodiments of the present invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1A:
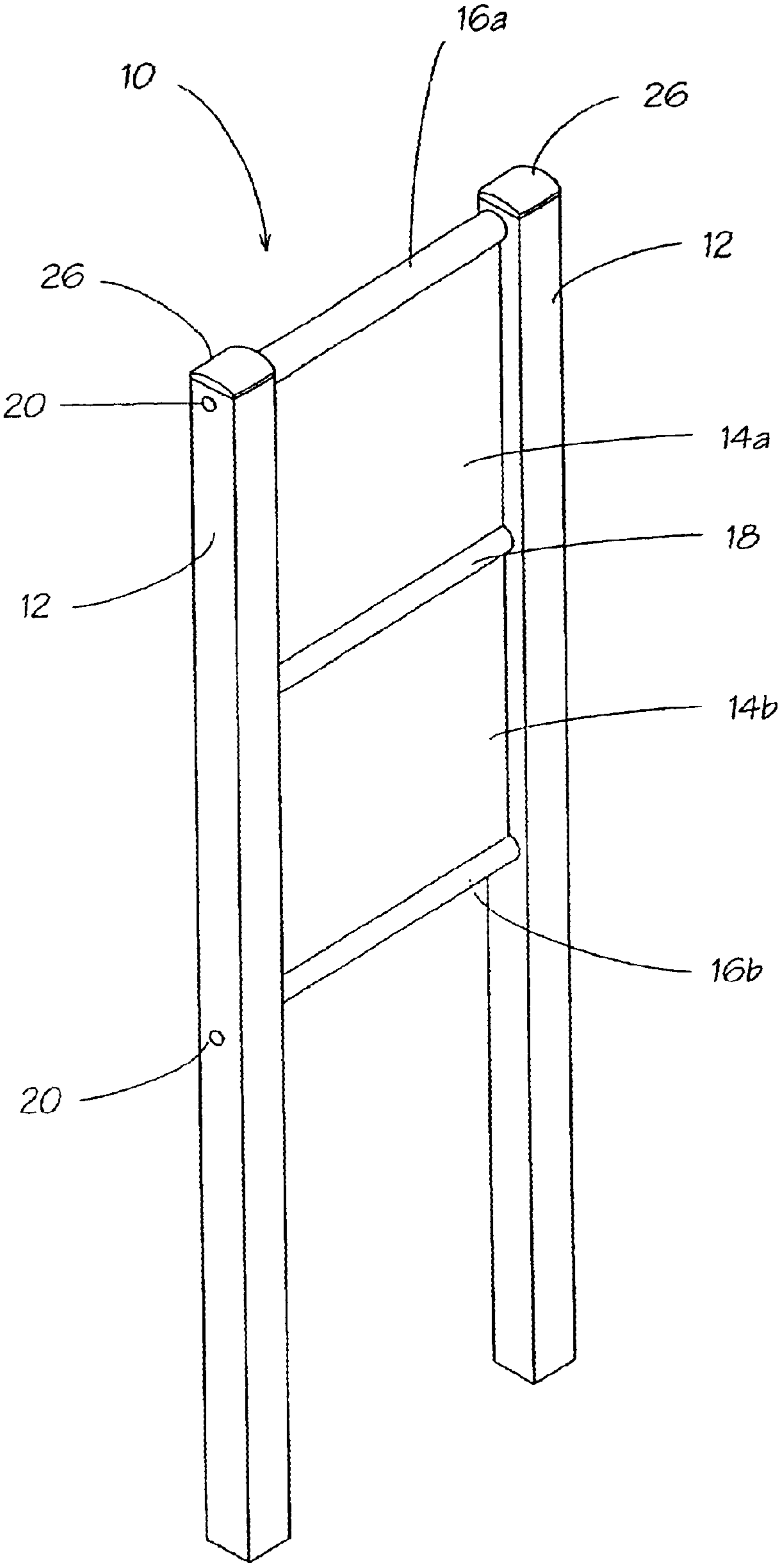
FIG. 1*a* is a perspective view of an embodiment of a sign system according to the present invention.

In the embodiment of the present invention shown in FIGS. 1*a*–4, a sign system 10 is supported by vertical uprights 12. An upper retaining rail 16*a* and a lower retaining rail 16*b* are connected between the vertical uprights 12 to hold sign panels 14*a*, 14*b*. Holes 20 in the vertical uprights 12 provide access for mechanical fasteners, such as bolts and screws, (see FIG. 1*b*) which hold the retaining rails 16*a* and 16*b* onto the vertical uprights 12. If the rails 16*a* and 16*b* and the vertical uprights comprise dissimilar metals, washers may be used as shown in FIG. 1*b* which are smaller in diameter than the retaining rails 16*a* and 16*b* thereby preventing water from running between the post to the panels which inhibits galvanic action from occurring between the dissimilar metals such as steel and aluminum. The holes 20 may be covered, plugged, or filled after the mechanical fasteners are connected to deter vandalism. A center retaining bracket 18 is used to separate and aid in holding the two side panels 14*a*, 14*b* that are positioned one on top of the other. The vertical uprights 12 are depicted as being substantially square in cross-section. However, vertical uprights 12 may have any cross-sectional shape. Complex extrusions are not required because retaining rails 16 are merely connected via a mechanical fastening device through a side of the vertical uprights 12. The vertical uprights 12, retaining rails 16, and retaining brackets 18 may be comprised of any material of suitable strength including, for example, plastics, metals such as aluminum, steels, metal alloys, and other high strength compounds and composites. Each vertical upright 12 also has a cap 26 which is held in place by a friction fit. Instead of a friction fit, any suitable attachment means may also be used such, for example, as adhesives and mechanical fasteners. In addition, cap 26 may also be formed integrally with vertical upright 12 instead of being a separate piece.

Figure 2:
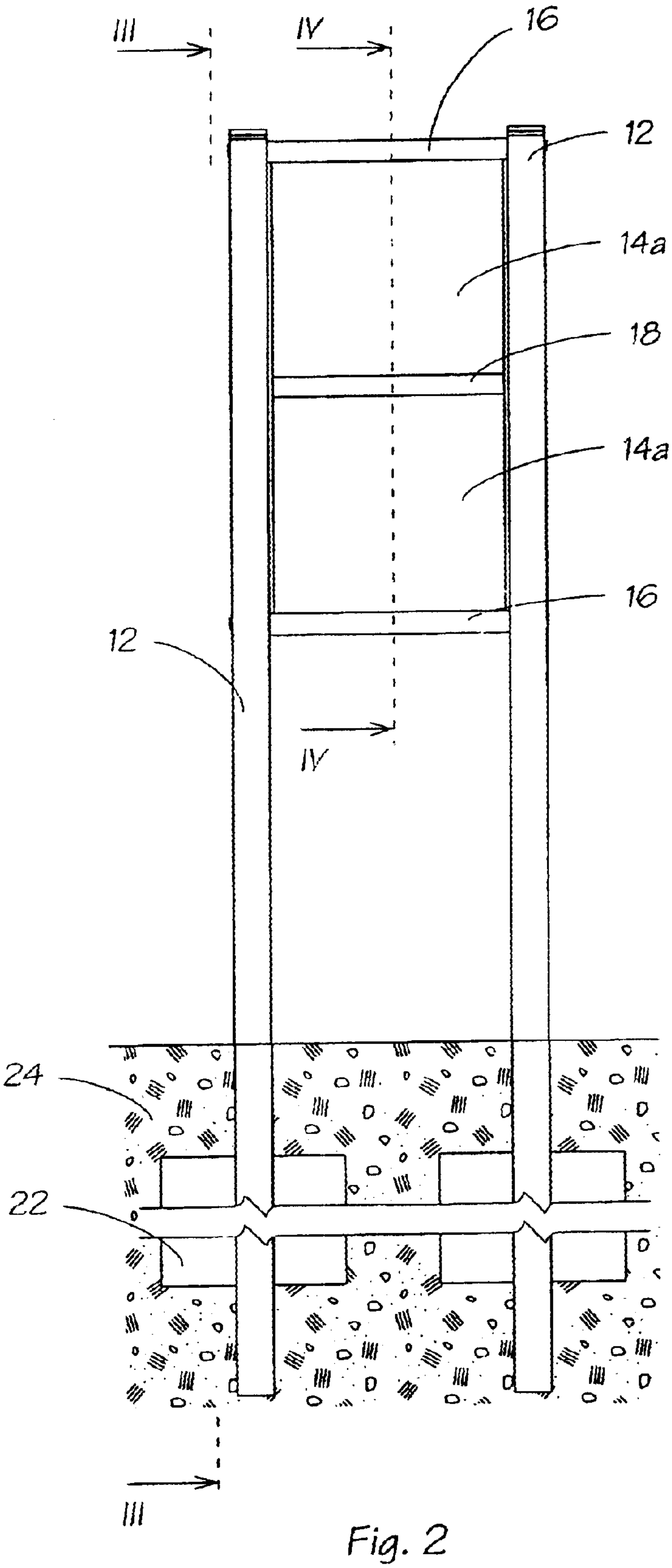
FIG. 2 is a front view of the embodiment of the present invention of FIG. 1*a;*
Figure 3:
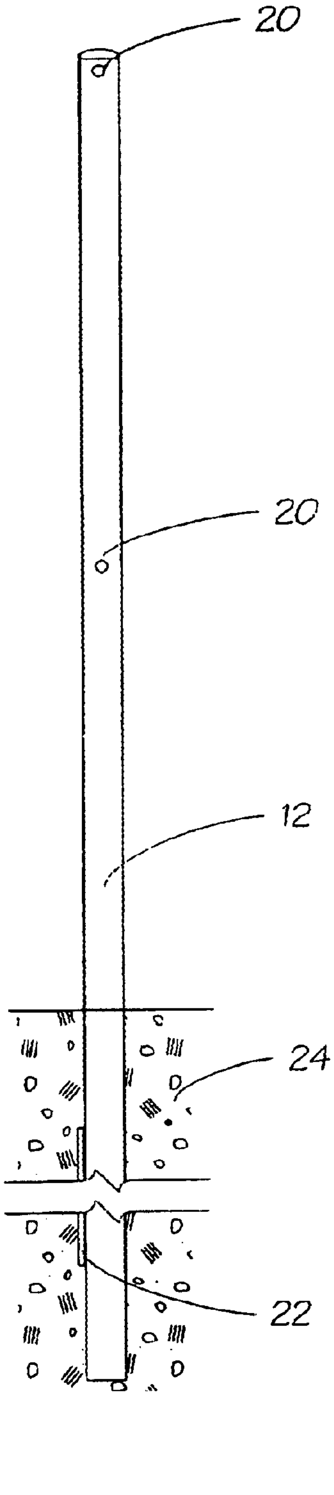
FIG. 3 is a side view of the embodiment of the present invention of FIG. 1*a;*

FIG. 2 and FIG. 3 (which is a side view of FIG. 2) show that the vertical uprights 12 may be mounted in the ground 24 and may include stabilizers 22 for reducing lateral displacement and prohibit removal of the vertical uprights 12. Other conventional devices and methods may be used for securing the vertical uprights 12 in the ground 24, such, for example, as securing the vertical uprights in a concrete base or using a flange plate to anchor the vertical uprights to a base material.

Figure 1B:
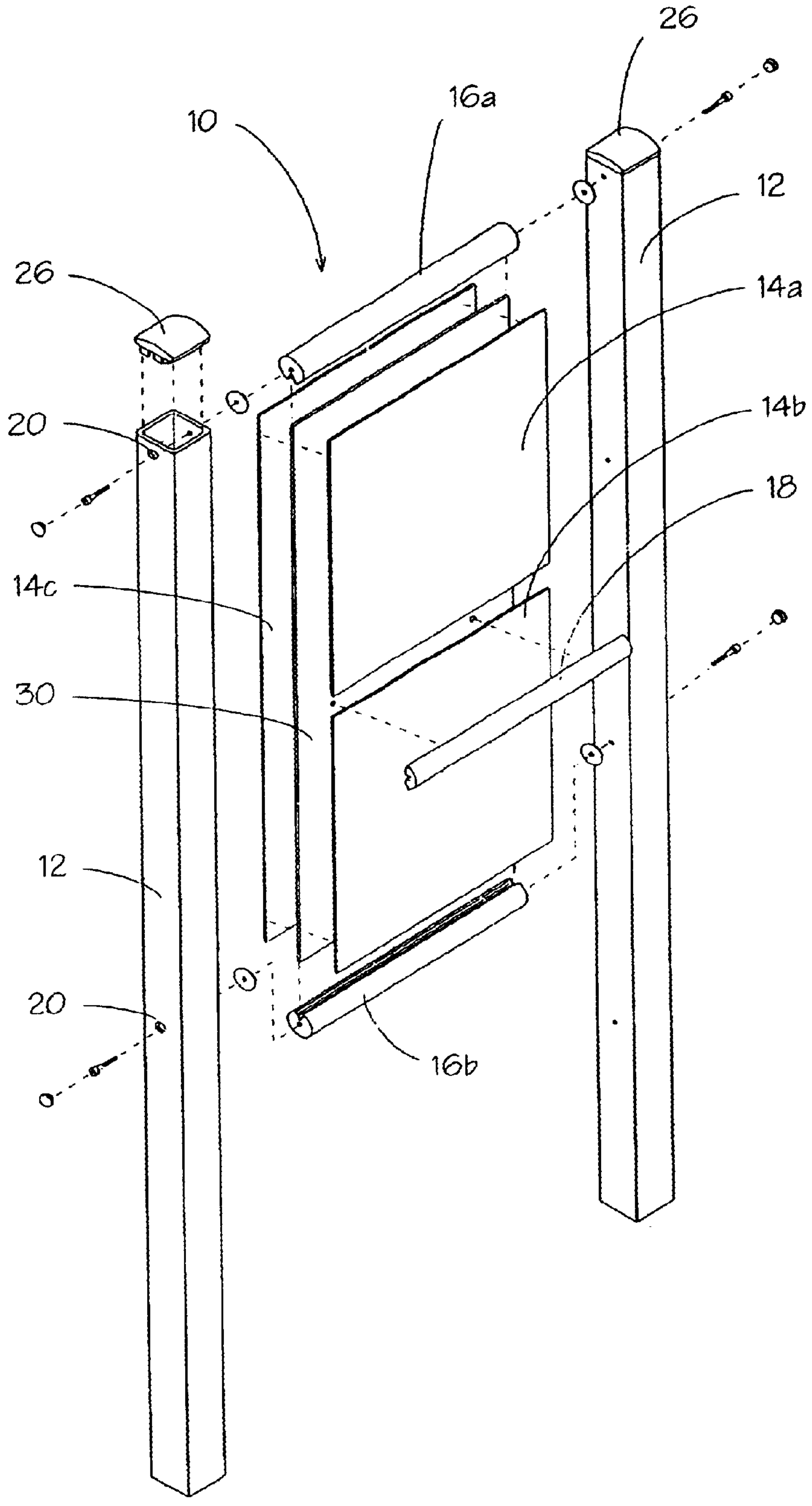
FIG. 1*b* is a fragmerntary exploded view of the sign system of FIG. 1*a;*
Figure 4:
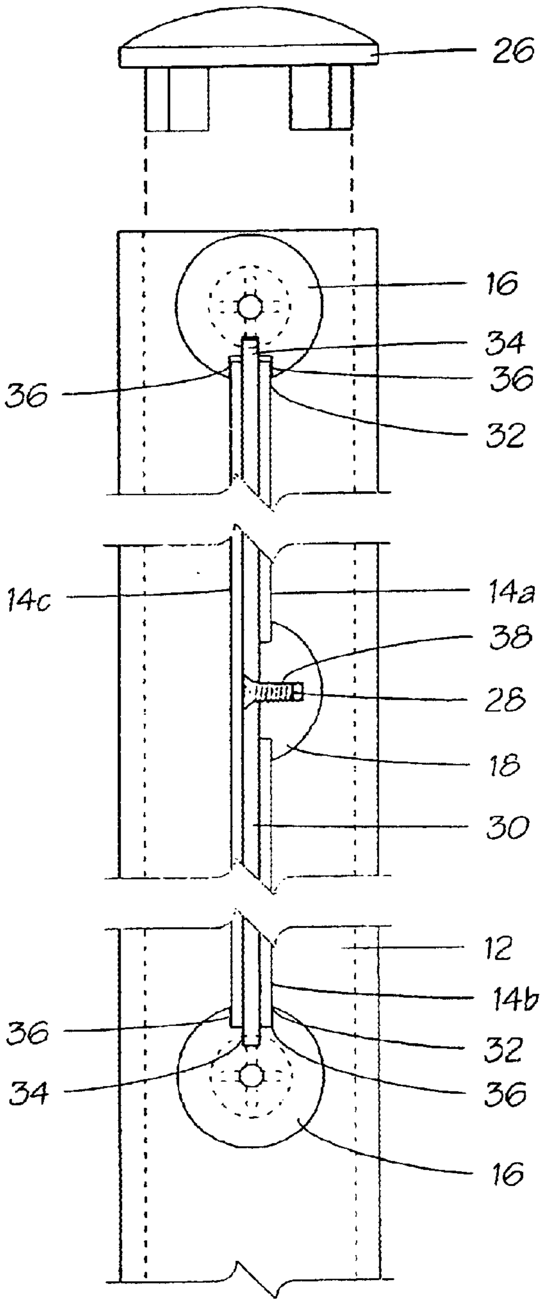
FIG. 4 is a partial sectional view of the sign system along line IV—IV of the embodiment of the present invention of FIG. 2.
Figure 5:
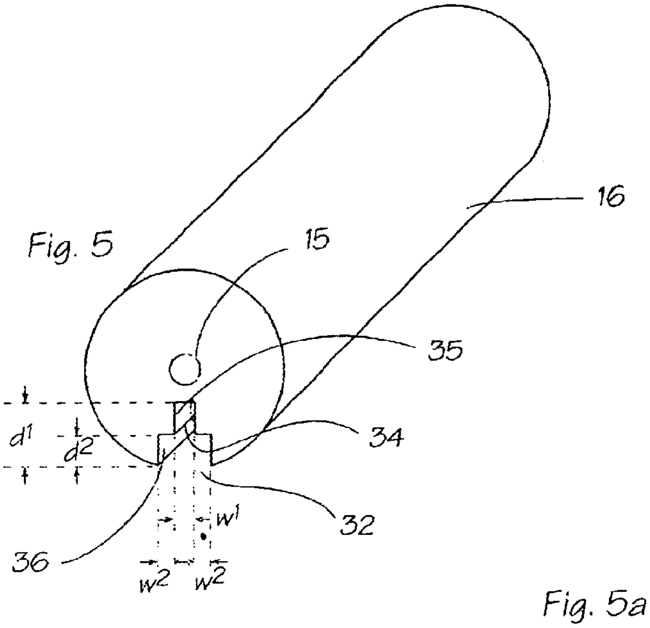
FIG. 5 is a perspective view of an embodiment of a rail of the sign system according to the present invention.

Referring to FIGS. 1*b* and 4, the sign system includes a core 30 comprising a planar sheet of material of suitable stiffness, such, for example, as a ⅛" thick aluminum plate, which is held between the retaining rails 16*a* and 16*b*. The core 30 reduces the vertical deflection by compression allowing any weight exerted on the upper retaining rail to be distributed throughout the panel and provides support for the sign system so that the sign panels 14 are not easily damaged by acts of vandalism and natural destructive forces, such, for example, as the wind, and so that two or more rows of sign panels may be supported between said upper and lower retaining rails 16*a* and 16*b*. Referring now also to FIG. 5, which is a detailed perspective drawing of the upper retaining rail 16*a*, each of the retaining rails 16*a* and 16*b* has a longitudinal channel 32 including a center portion 34 and side portions 36 along either side of the center portion 34. The center portion 34 has a width w1 and a depth d1 and the side portions have widths w2 and depths d2. The upper and lower ends of the core 30 are inserted into the center portion 34 of channel 32 in retaining rails 16*a* and 16*b*. In this manner, the upper and lower retaining rails 16*a* and 16*b* and the core 30 become a beam wherein the core 30 is the web of the beam. The arrangement of the retaining rails 16*a* and 16*b* and core 30 provides a very strong but sheer backing for sign panels 14*a*, 14*b*, and 14*c*. The sides of the center portion 34 form stops 35 which prevent the ends of the core 30 from entering the side portions 36 of the channel 32. The sign panels 14*a*, 14*b*, and 14*c* are then inserted into the side portions 36 of the retaining rails 16*a* and 16*b*, and the retaining rails fixedly connected to the posts 12. FIG. 5 shows a hole 15 which may be used to insert a non-conductive metal fastener (screw or bolt) to connect the retaining rail 16*a* (and 16*b*) to the uprights. 12. The hole 15 is preferably threaded for detachably receiving a threaded connection element (not shown). Although, the upper and lower retaining rails 16*a* and 16*b* are preferably detachably connected to the posts 12 so that sign panels 14 may be replaced, the upper and lower retaining rails 16*a* and 16*b* may also be fixedly connected to the posts 12 by threaded mechanical fasteners, high strength adhesives, sheer pins or the like. In addition, FIG. 5 depicts the upper retaining rail 16*a* as having a circular cross section. However, the upper and lower retaining rails 16*a* and 16*b* may have any cross sectional shape that accommodates the channel 32 while maintaining the structural integrity required.

Figure 6:
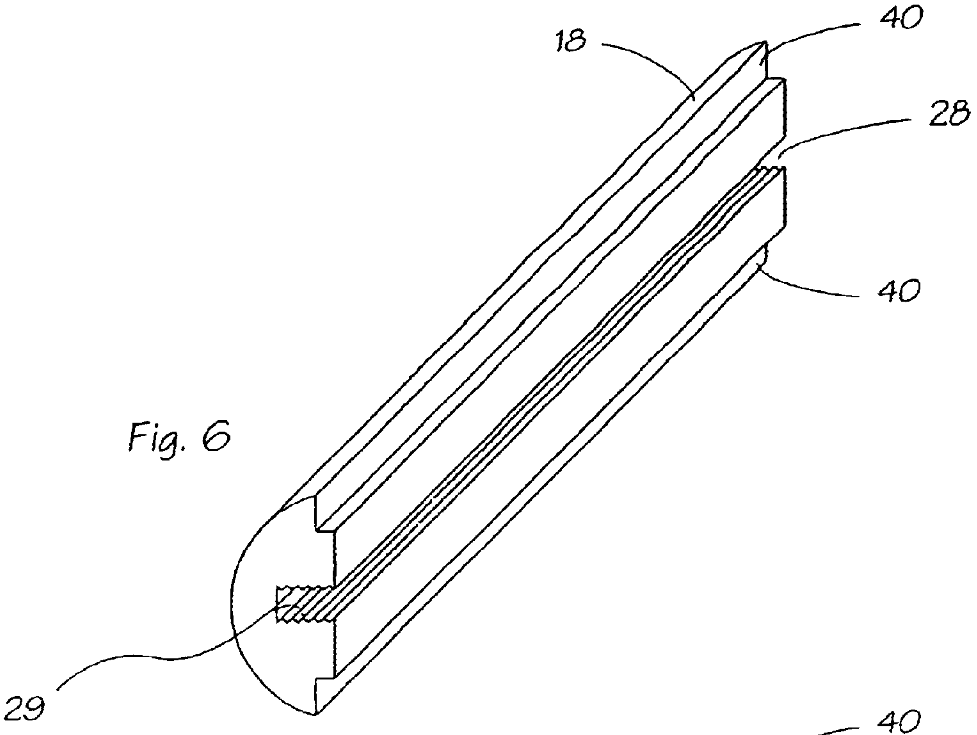
FIG. 6 is a perspective view of an embodiment of a retaining bracket according to the present invention.
Figure 6A:
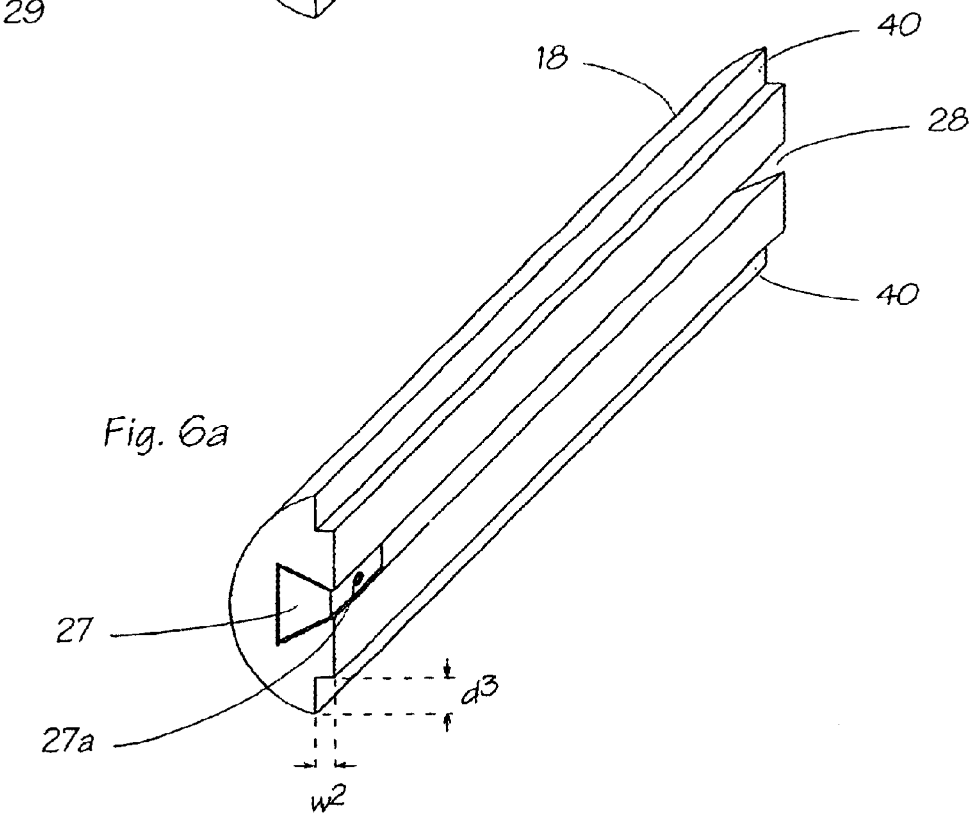
FIG. 6*a* is a perspective view of another embodiment of a retaining bracket according to the present invention.

The left side of FIG. 4 shows a sign panel 14*c* which spans the full distance between the upper retaining rail 16*a* and the lower retaining rail 16*b*. The sign panels 14*a*, 14*b*, and 14*c* are substantially non-flexible, planar elements, which may be aluminum plates, 16 gauge steel plate with a non-conductive surface, embedment fiberglass sheet, high pressure laminate, porcelain enamel tiles of suitable strength, or other suitable planar materials which are weather resistant and which will resist localized surface impact. The right side of FIG. 4 shows two sign panels 14*a*, 14*b*, one mounted above the other. The bottom end of the upper sign panel 14*a* and the top end of the lower sign panel 14*b* are held against the core 30 by a center retaining bracket 18. The center retaining bracket 18 has a central channel 28, in which a threaded fastening device 38 is received for holding the center bracket 18 against the core 30, which is precision drilled for receipt of the center retaining bracket 18. One or more of the threaded fastening devices 38 may be used to hold the center bracket 18 against the core 30, which is precision drilled for receipt of the center retaining bracket 18. FIG. 6, shows a detailed perspective view of the center bracket 18. FIG. 6 shows that the central channel 28 has ridges 29 which run longitudinally along the walls of the central channel 28. These ridges act as threads which are laid longitudinally in the walls for receiving the threaded fastening devices at any point along the channel. Instead of the central channel 28, the center bracket 18 may also have threaded holes for receiving the threaded fasteners 38. The center bracket 18 also has two side cutout portions 40. Each cutout portion 40 has a depth d3 and a width w2. The width w2 of the side channels 40 is substantially the same as the width w2 of the side portion 36 of channel 32. Instead of being threaded, the central channel 28 may comprise a T-groove or dove tail shape in which connection elements including threaded holes which have a corresponding T-groove shape or dove-tail shape for sliding into the T-groove or dove tail groove and held for connection to the core 30 by the threaded connection device 38. For example, FIG. 6*a* shows a dove tail groove 28*a* and corresponding connection piece 27 in the dove tail groove 28*a*, the connection piece 27 is slidable to any location along the dove tail groove. The connection piece 27 has a threaded hole 27*a* for receiving the threaded fastening device 38 (see FIG. 4).

Since the core 30 is held in the center portion 34 of the channel 32, the same rails 16, bracket 18, and core 30 may be used in signs requiring a sign panel 14 on only one side of the core 30 and in signs that require sign panels 14 on both sides of the core 30.

More than two rows of sign panels 14 may also be installed on one side of the core 30 by installing one of the center brackets 18 between each pair of vertically adjacent rows. The panels 14 are preferably made in standardized sizes and based on a uniform size progression such that a large variety of arrangements and configurations of the signs panels 14 is possible. For instance, each individual sign panels 14 does not have to extend the entire width between the uprights 12. Therefore, columns may also exist on the overall assembly of the sign panel 10. In addition, the rows separated by the center bracket 18 do not have to extend the entire length between the vertical uprights 12. For example, a sign having three sign panels on each side may have two panels separated by a center bracket 18 mounted adjacent one post 12 to 15 approximately a center of the core 30, and the third panel, which has the height of the previous two panels, is mounted in the space between the center of the core and the second post 12.

Figure 5A:
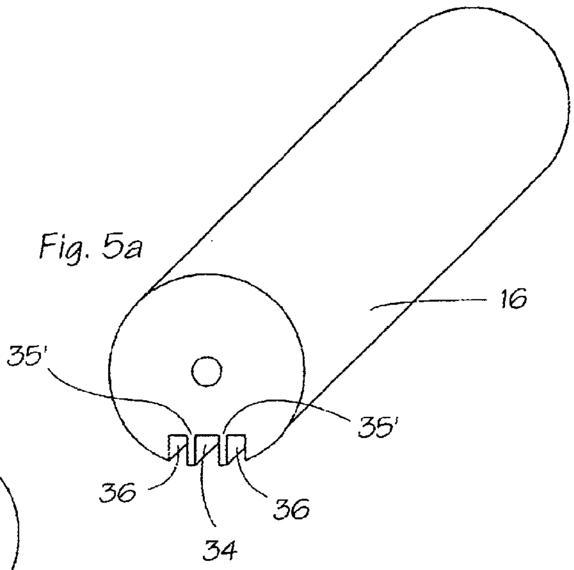
FIGS. 5*a* and 5*b* show different embodiments of the rail of the sign system.

Although the stops 35 are shown in FIG. 5 as being formed by the stepped channel 32, other types of stops 35 may also be used. For example, FIG. 5*a* shows an upper rail. 16*a* having a channel 32 which is partitioned into three separate and discrete portions, i.e., the center portion 34 and two side portions 36. In this embodiment, the core is positioned and held in the center portion 34 by partitions 35'.

Figure 5B:
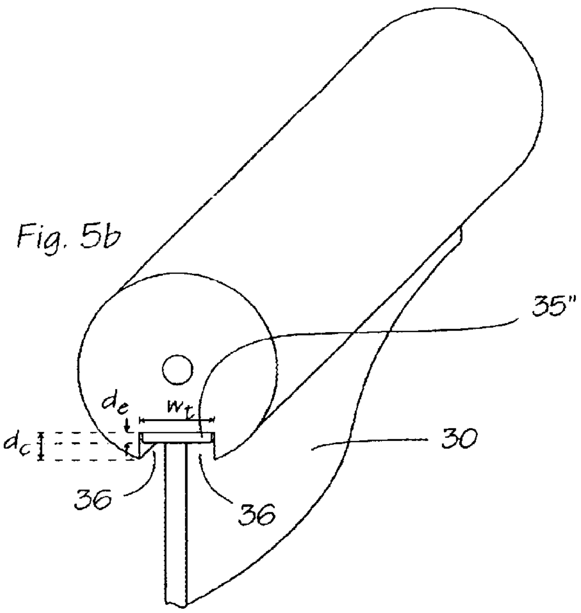

In yet another embodiment shown in FIG. 5*b*, the channel 32 comprises one continuous width and depth. An edge piece 35" is connected to the end of the core 30 and is inserted into the channel 32. The edge piece 35" has substantially the same width. $W_T$ as the channel 32. The depth $d_e$ of the edge piece 35" is less than the depth $d_c$ of the channel 32. Therefore, in this embodiment, the side channels 36 are formed between the core 30 and the sides of the channel 32 because the edge piece 35" maintains the core 30 at the center of the width of the channel 32.

Figure 7:
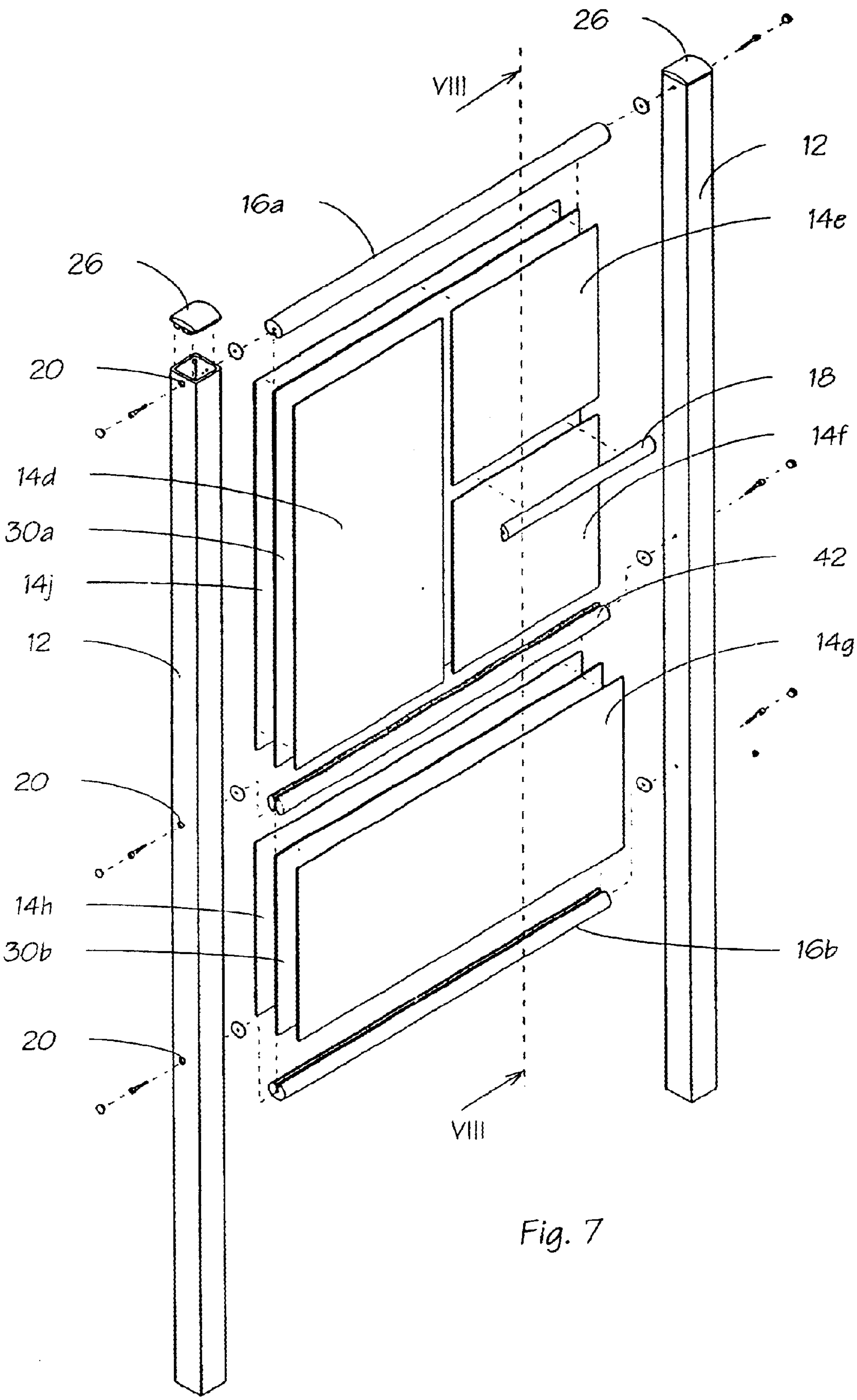
FIG. 7 is a fragmentary exploded view of another embodiment of a sign system according to the present invention with an optional center rail.
Figure 8:
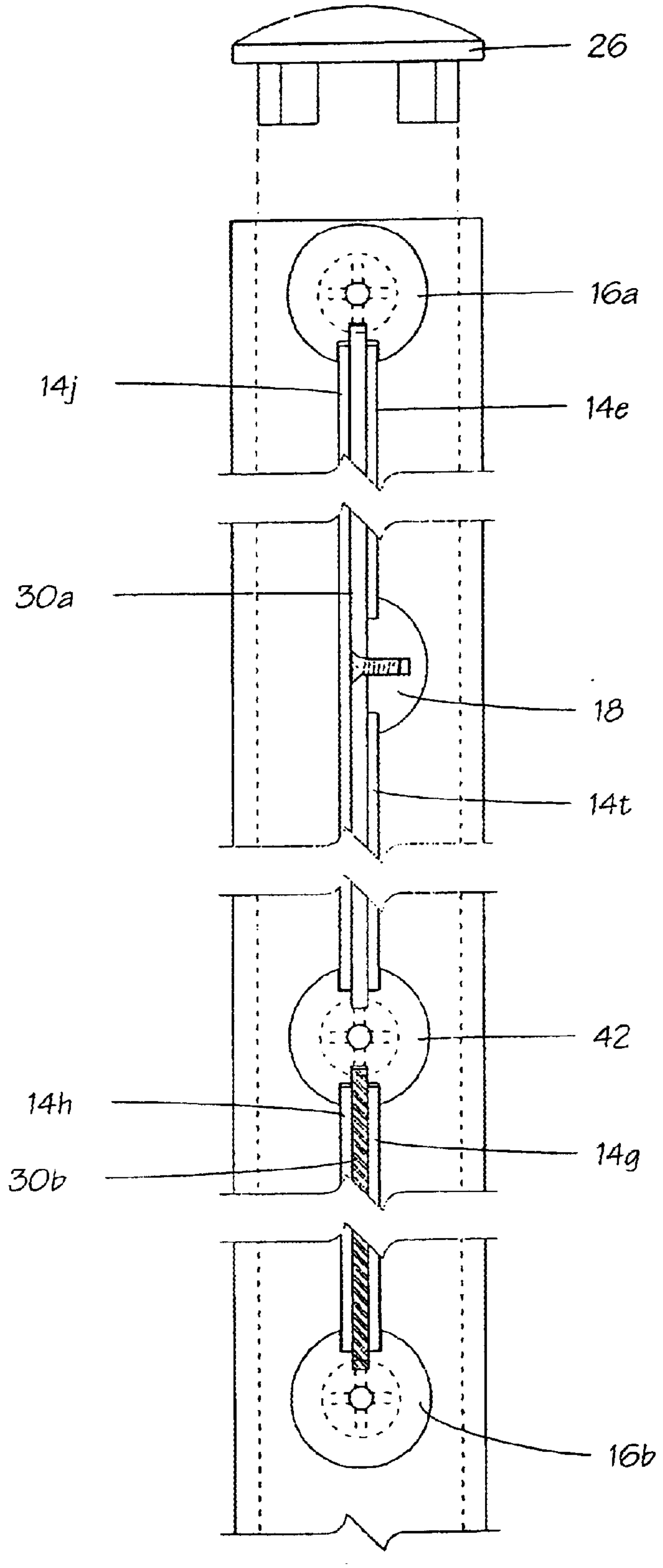
FIG. 8 is an sectional view of the embodiment of the present invention of FIG. 7 along line VIII—VIII.

In some cases, where a larger sign area is required, a core 30 covering the entire sign area may exceed the appropriate lateral rigidity and not have structural integrity as a continuous member. In such cases, the core 30 is prone to warpage due to pressure applied by wind and other natural forces and/or deliberate destructive force. In such cases, a center retaining rail 42, as shown in FIGS. 7 and 8, may be used to connect two cores 30*a* and 30*b*. The center retaining rail 42 is connected between the two vertical uprights 12 similarly to the retaining rails 16*a* and 16*b*. The center retaining rail 42 holds the bottom of an upper core 30*a* and the top of a lower core 30*b*, thereby providing an additional central support for the large sign area. Each of the upper and lower cores 30*a* and 30*b* may include one or more rows and columns of sign panels 14, as described earlier with respect to core 30. For example, FIG. 7 shows that the front of core 30*a* has a first column including sign panel 14*d* on the left hand side which spans the entire height of the core 30*a* and a second column having two rows of sign panels 14*e* and 14*f* separated by center retaining bracket 18.

Figure 9:
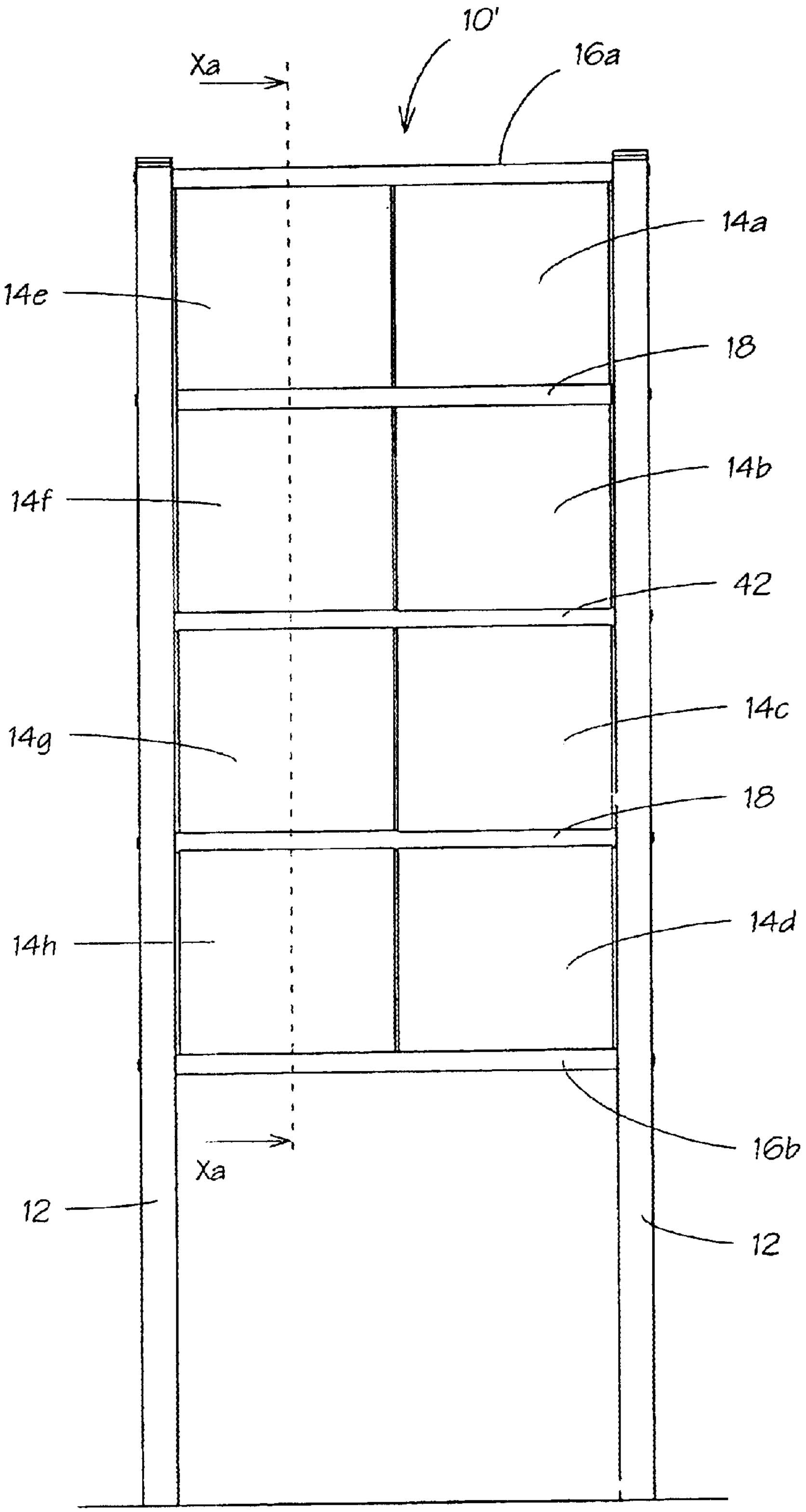
FIG. 9 is a front view of another embodiment of a sign system according to the present invention.
Figure 10A:
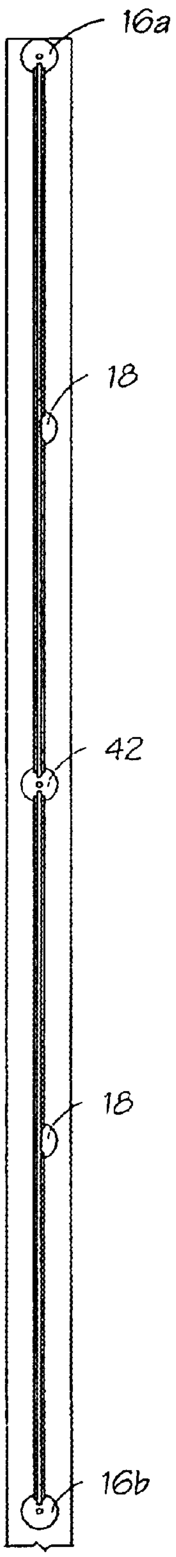
FIGS. 10*a*–10*d* are sectional views of different embodiments of the sign system according to the present invention.
Figure 10B:
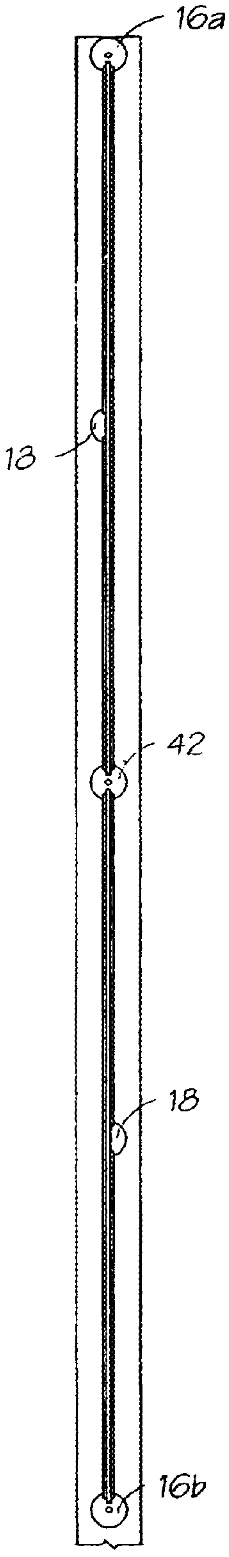
Figure 10C:
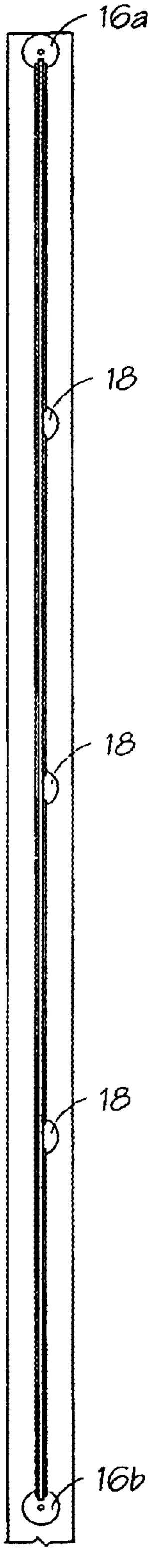
Figure 10D:
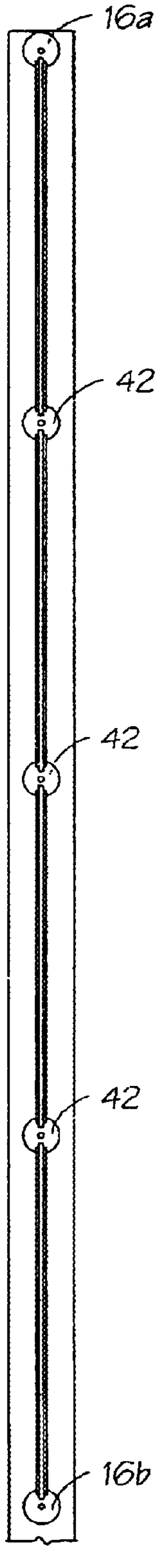

In a further example, FIG. 9 shows two columns of sign panels with four rows each. FIGS. 10*a* through 10*d* show various exemplary configurations of center rails 42 and center brackets 18 which may be used with multiple rows and multiple columns of sign panels. In FIG. 10*a*, a center rail 42 divides the sign into two cores 30*a* and 30*b* with two retaining brackets 18 on the front side so that the front face has four rows and the back face has two large rows. FIG. 10*a* corresponds to the cross section of FIG. 9. FIG. 10*b* shows a similar embodiment in which a center retaining bracket 18 is mounted on a front of core 30*a* and a back side of core 30*b*. Each side has one large row and two smaller rows. In FIG. 10*c*, one large core 30 is used and three center retaining brackets 18 divide the front face of the sign system into four rows. Finally, FIG. 10*d* shows that the center retaining rails 42 may be used to divide each row. In this case, four cores 30*a*–30*d* are required.

Each sign system in FIGS. 10*a*–10*d* may also be used as single faced signs wherein there are no sign panels required to be mounted on either the right or the left side of the cores 30*a* and 30*b*. However, the same sign systems could be used as a double-sided sign systems. In practice, a blank sign panel may be installed on the side that no sign is required to give a finished look and to cover any fasteners which may be inserted in the core 30 for holding center retaining brackets 18. If different graphics are required on a single faced sign on a seasonal or varying use bases, a first currently applicable graphic may be placed on the first displayed side of the sign and a second graphic may be placed on the second side of a sign panel for convenience. When the seasonal or varying use bases require that the second graphic be displayed, the second graphic is readily available and is easily switched with the first graphic.

The upper and lower retaining rails 16*a* and 16*b* and the cores 30*a* and 30*b*, as well as the optional center retaining rail 42, may be used for either single-sided applications or for double-sided applications, without altering the parts or the assembly of the parts. The implications of this ability is that only a few parts are required to make all the different signs required for an entire architectural site. When making signs for an architectural project, many signs are required. In most cases, the parts for each sign are very specific, making it difficult to order all the correct parts. Since each sign in the inventive system uses the same types of parts, large quantities of pieces such as the retaining rails 16, posts 12, and cores 30 can be stored and used as needed. That is, only one type of retaining rail 16, one type of center bracket 18, one type of center retaining rail 42 are required.

If the sign panels 14 are designed in standardized shapes and sizes, the sign system 10 is completely modular, thereby allowing a wide variety of sign configurations, using the same basic materials, i.e., the rails 16 and 42, the brackets 18, and the cores 30, cut to a suitable size.

Figure 11:
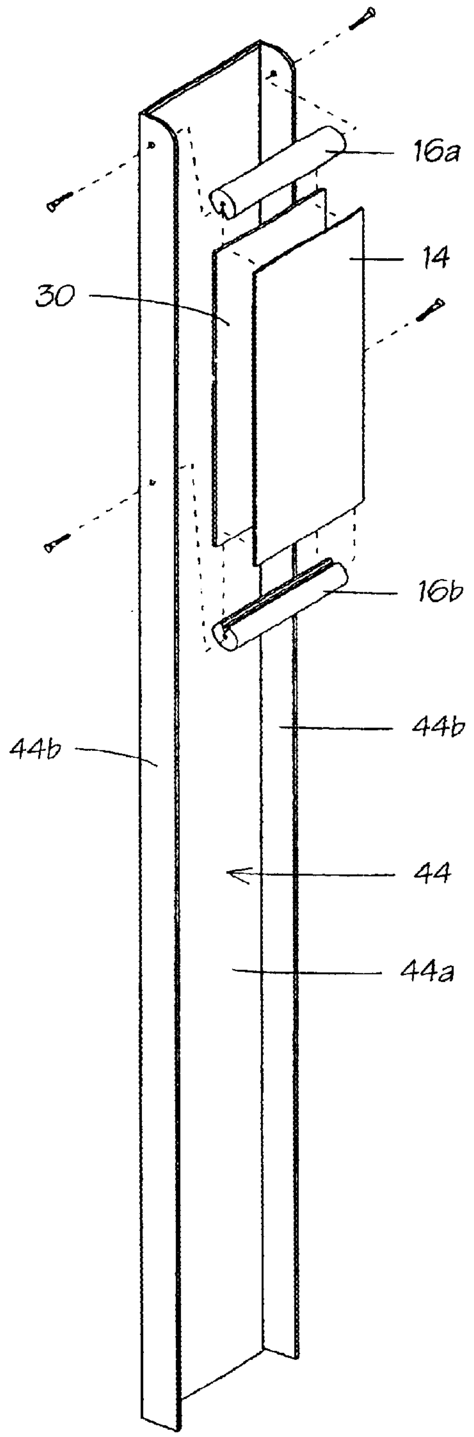
FIG. 11 is a fragmentary exploded view of another embodiment of a sign system according to the present invention.
Figure 12:
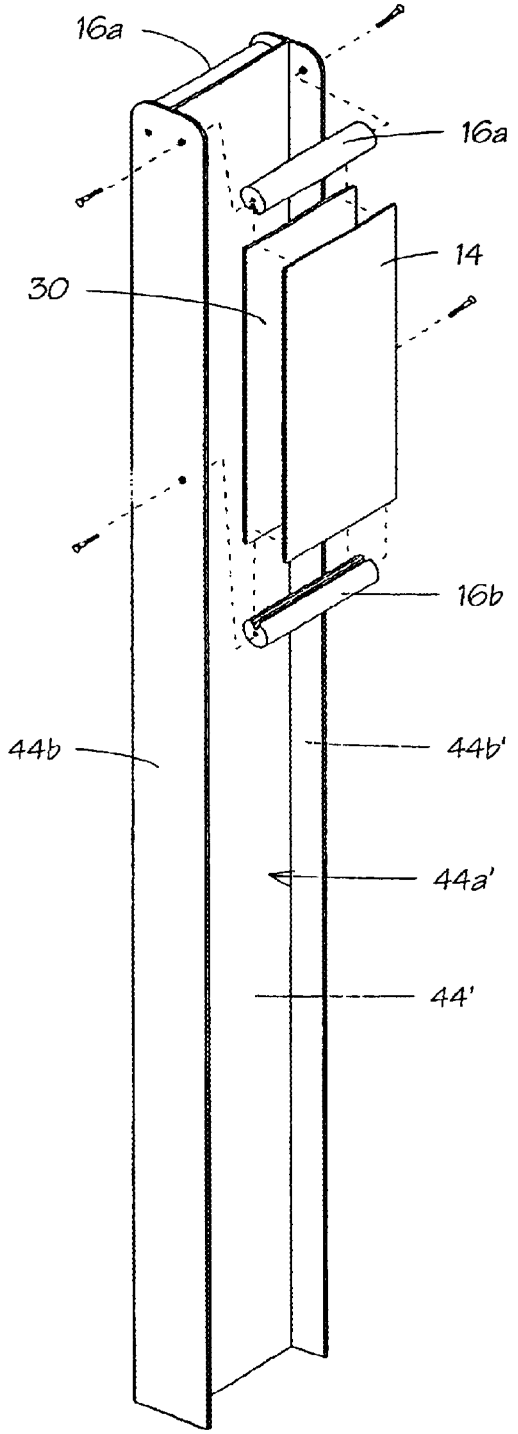
FIG. 12 is a fragmentary exploded view of yet another embodiment of a sign system according to the present invention.
Figure 13:
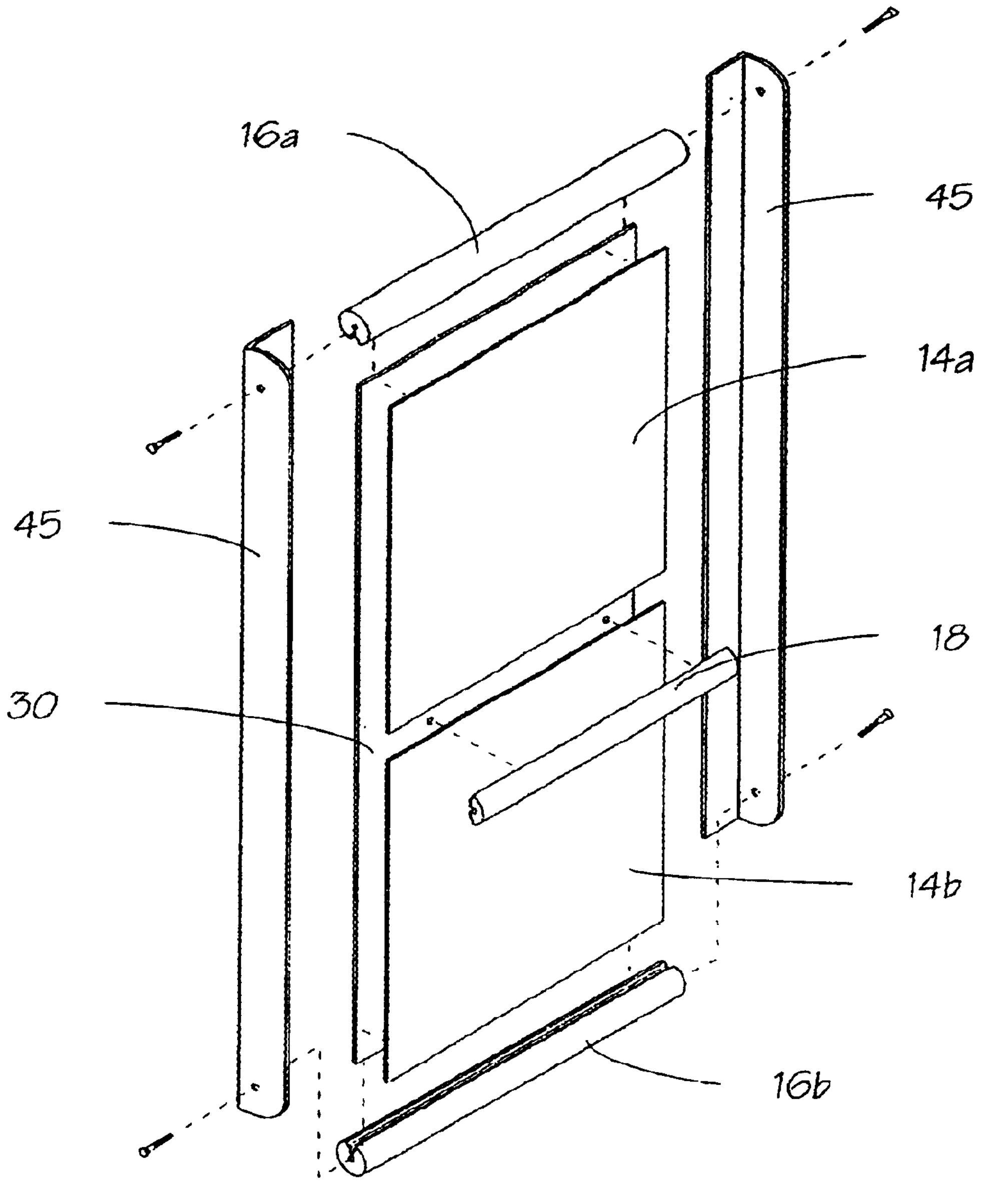
FIG. 13 is a fragmentary exploded view of another embodiment of a sign system according to the present invention.
Figure 14:
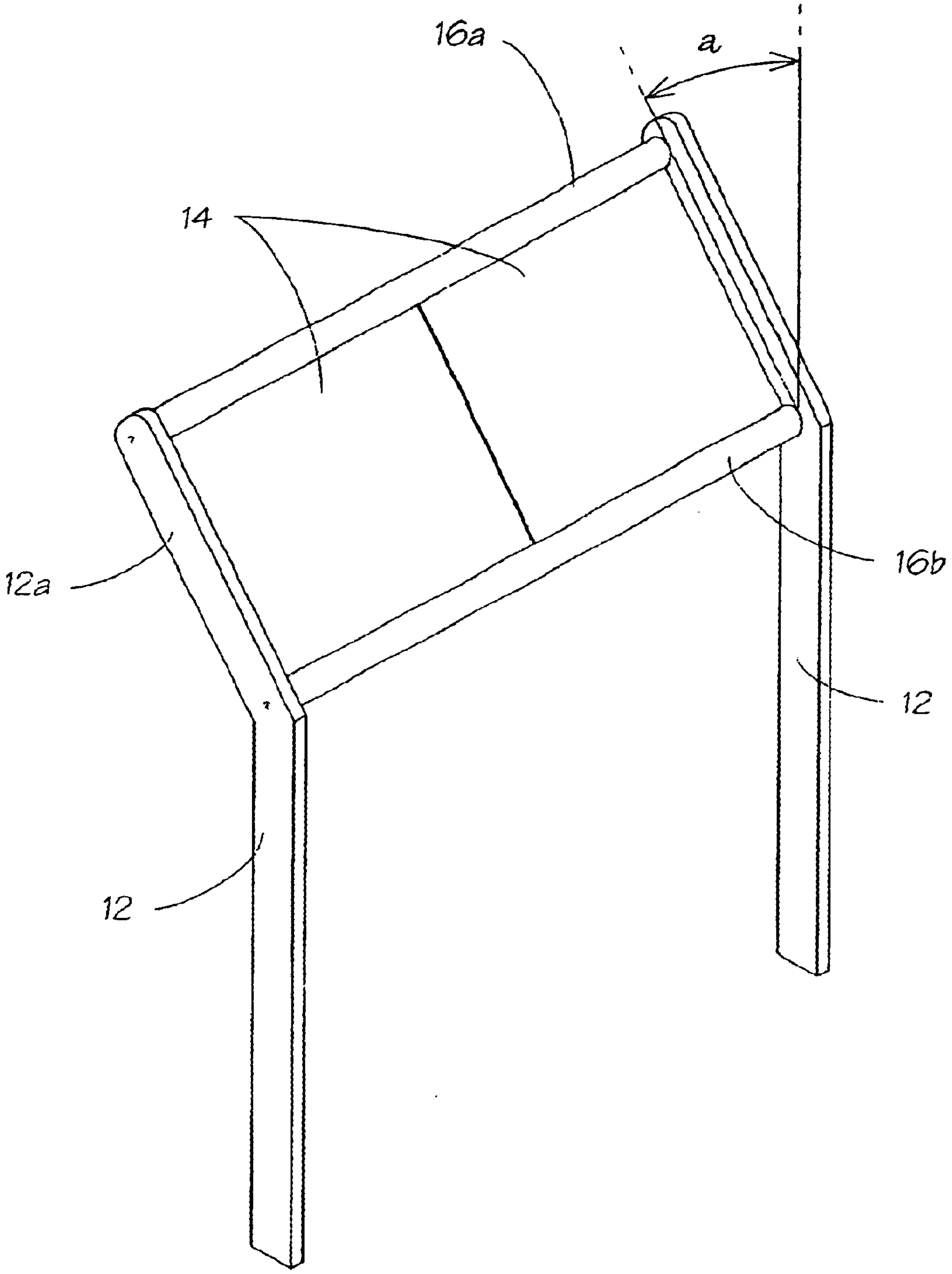
FIG. 14 is a perspective view of another embodiment of a sign system according to the present invention.

Referring now to FIGS. 11–13, instead of hollow shapes or sections, the vertical uprights 12 may also comprise substantially flat posts such as angle, channel, or "I"-beams. Use of a structural section creates a one-piece post which holds both sides of the retaining rails 16. For example, FIG. 11 shows a vertical upright support 44 having a central portion 44*a* and two side portions 44*b* which form a single sided channel. In this embodiment, a core 30 and one or more sign panels 14 may be mounted between the side portions 44*b*. FIG. 12 shown a different embodiment of a vertical support 44' in which the two side portions 44*b*' form a double sided channel or I-beam which can accept a core on either side of the central portion 44*a*'. Instead of being mounted in the ground, the support 44 may be cut to a length sufficient to hold the side panel 14 and mounted directly to a wall or other vertical foundation. FIG. 13 shows two angles 45 as vertical supports. The angles are a sufficient length to hold a core 30 and two sign panels 14*a* and 14*b*. In a further embodiment, the portion of the vertical uprights 12 to which the sign panels are connected may be angled away from an intended viewer such, for example, as shown in FIG. 14. Depending on the height of the sign and the position of the intended viewer, the angle $\alpha$ of the angled portion 12*a* may be within the range of 0 to 90 degrees to vertical.

The invention is not limited by the embodiments described above which are presented as examples only but can be modified in various ways within the scope of protection defined by the appended patent claims.

I claim:

1. A signage system, comprising:

two laterally spaced vertical supports, each of said vertical supports having an upper end and a lower end and a constant cross-sectional shape between said upper end and said lower end;

an upper rail having first and second ends and an upper rail length between said first and second ends;

a lower rail having first and second ends and a lower rail length between said first a second ends, said upper rail and said lower rail each having confrontingly opposed longitudinal channels running substantially between said first and second ends thereof, each of said confrontingly opposed longitudinal channels having a longitudinal central portion and longitudinal side portions on either side of said longitudinal central portions;

said first ends of said upper and lower rails fixedly connected to one of said two vertical supports and said second ends of said upper and lower rails fixedly connected to the other of said two vertical supports such that said upper and lower rails are connected to said two vertical supports between said upper and lower ends of said two vertical supports;

a substantially planar core piece having a first planar side and a second planar side and having upper and lower edges and side edges, said upper and lower edges releasably received in said central portions of said confrontingly opposed longitudinal channels and said planar core piece having a core width between said side edges, wherein said core width, said upper rail length and said lower rail length are substantially equal;

said longitudinal channels having stops between said longitudinal central portion and said longitudinal side portions so that said upper and lower edges of said core are retained in said central portions of said longitudinal channels; and a substantially rigid signal panel having an upper edge and a lower edge being receivable in said side portions of said confrontingly opposed longitudinal channels on one of said first planar side and said second planar side of said core piece, said signage system thereby accommodating sign panels on said first planar side, said second planar side, and both of said first and second planar sides of said core piece.

2. The signage system of claim 1, wherein said central longitudinal portion of each of said longitudinal channels comprises a first depth and said side portion comprises a second depth, wherein said first depth is greater than said second depth so that said stops comprise sides of said central longitudinal portion.

3. The signage system of claim 1, wherein said stops comprise barriers between said central longitudinal portion and said side portions of said longitudinal channels.

4. The signage system of claim 1, wherein a portion of said supports is arranged at an angle within the range of 0 to 90 degrees to vertical.

5. The architectural signage system of claim 1, wherein said stops comprise an edge piece connected to said upper end and lower end of said core piece and wherein a width of said edge piece is equal to a width of said channels.

6. The signage system of claim 1, wherein said upper rail, said lower rail and said core piece form an open-ended structural I-beam connected between said vertical supports, said core piece comprising a web of the I-beam and said upper and lower rails comprising flanges of the I-beam.

7. The signage system of claim 1, wherein said vertical supports comprise means for connecting said vertical supports to a support for supporting said upper rail, said lower rail, said core piece, and said sign panel.

8. The signage system of claim 1, wherein said upper rail and said lower rail are fixedly connected to said vertical supports via threaded connectors.

9. The signage system of claim 1, further comprising a retaining bracket fixedly connectable to said first planar side of said core, said retaining bracket forming channels with said core confrontingly opposed to said side portions of said longitudinal channels of said upper rail and said lower rail on said first planar side of said core, wherein said sign panel comprises an upper panel and a lower panel and said upper panel is held in said side portion of said upper rail and an upper channel of said retaining bracket and said lower panel is held in said side portion of said lower rail and a lower channel of said retaining bracket.

10. The signage system of claim 9, wherein said retaining bracket comprises an inner side facing said core piece and an outer side, said inner side having a continuous channel for receiving a connector element at any location therein, wherein said connector element holds said retaining bracket onto said core piece.

11. The signage system of claim 9, wherein said upper and lower sign panels comprise one of a set of modular sizes so that various configurations are possible.

12. The signage system of claim 9, wherein said horizontal widths of each said retaining bracket, said upper panel, and said lower panel is less than a width between said two vertical supports, thereby allowing a larger panel to be inserted alongside said upper panel, said lower panel and said retaining bracket.

13. A signage system, comprising:

two laterally spaced vertical supports;

an upper rail having first and second ends;

a lower rail having first and second ends, said upper rail and said lower rail each having confrontingly opposed longitudinal channels running substantially between said first and second ends thereof, each of said confrontingly opposed longitudinal channels having a longitudinal central portion and longitudinal side portions on either side of said longitudinal central portions;

said first ends of said upper and lower rails fixedly connected to one of said two vertical supports and said second ends of said upper and lower rails fixedly connected to the other of said two vertical supports such that said upper and lower rails are connected to said two vertical supports by a fixed connection;

a substantially planar core piece having a first planar side and a second planar side and having upper and lower edges releasably received in said central portions of said confrontingly opposed longitudinal channels, wherein said upper and lower edges of said core piece are held in said longitudinal channels by the fixed connection of said upper and lower rails to said vertical supports;

said longitudinial channels having stops between said longitudinal central portion and said longitudinal side portions so that said upper and lower edges of said core are retained in said central portions of said longitudinal channels;

a retaining bracket fixedly connectable to said first planar side of said core, said retaining bracket forming channels with said core confrontingly opposed to said side portions of said longitudinal channels of said upper rail and said lower rail on said first planar side of said core; and an upper sign panel and a lower sign panel, wherein said upper sign panel is held in said side portion of said upper rail and an upper channel of said retaining bracket and said lower sign panel is held in said side portion of said lower rail and a lower channel of said retaining bracket.

14. The signage system of claim 13, wherein said retaining bracket comprises an inner side facing said core piece and an outer side, said inner side having a continuous channel for receiving a connector element at any location therein, wherein said connector element holds said retaining bracket onto said core piece.

15. The signage system of claim 13, wherein said upper and lower sign panels comprise one of a set of modular sizes so that various configurations are possible.

16. The signage system of claim 13, wherein said horizontal widths of each said retaining bracket, said upper panel, and said lower panel is less than a width between said two vertical supports, thereby allowing a larger panel to be inserted alongside said upper panel, said lower panel and said retaining bracket.

17. The signage system of claim 13, wherein said upper rail and said lower rail are fixedly connected to said vertical supports via threaded connectors.

18. A signage system, comprising:

two laterally spaced vertical supports;

an upper rail having first and second ends;

a lower rail having first and second ends, said upper rail and said lower rail each having confrontingly opposed longitudinal channels running substantially between said first and second ends thereof, each of said confrontingly opposed longitudinal channels having a longitudinal central portion and longitudinal side portions;

said upper and lower rails being mounted between said two vertical supports;

a substantially planar core piece having a first planar side and a second planar side and having upper and lower edges being mounted between said upper and lower rails in said central portions of said confrontingly opposed longitudinal channels;

said longitudinal channels having stops between said central portion and said side portions so that said upper and lower edges of said core are retained in said central portions of said longitudinal channels;

a sign panel having an upper edge and a lower edge being receivable in said side portions of said longitudinal channels on one of said first planar side and said second planar side of said core piece, said signage system thereby accommodating signage on said first planar side, said second planar side, and both of said fist and second planar sides of said core piece; and a center rail being mounted between said two vertical supports between said upper rail and said lower rail and having upper and lower channels confrontingly opposed to said longitudinal channels of said upper and lower rails, each said upper and lower channels having a center portion and side portions;

said core piece comprising a first core having an upper edge and a lower edge held in said longitudinal channel of said upper rail and said upper channel of said center rail; and said core piece comprising a second core having an upper edge held in said lower channel of said center rail and a lower edge held in said longitudinal channel of said lower rail.

19. The signage system of claim 18, wherein said central longitudinal portion of each of said longitudinal channels comprises a first depth and said side portion comprises a second depth, wherein said first depth is greater than said second depth so that said stops comprise sides of said central longitudinal portion.

20. The signage system of claim 18, wherein said stops comprise barriers between said central longitudinal portion and said side portions of said longitudinal channels.

21. The signage system of claim 18, further comprising a retaining bracket fixedly connectable to said first planar side of said core, said retaining bracket forming channels with said core confrontingly opposed to said side portions of said longitudinal channels of said upper rail and said lower rail on said first planar side of said core, wherein said sign panel comprises an upper panel and a lower panel and said upper panel is held in said side portion of said upper rail and an upper channel of said retaining bracket and a second panel of said two panels is held in said side portion of said lower rail and a lower channel of said retaining bracket.

22. The signage system of claim 21, wherein said retaining bracket comprises an inner side facing said core piece and an outer side, said inner side having a continuous channel for receiving a connector element at any location therein, wherein said connector element holds said retaining bracket onto said core piece.

23. The signage system of claim 21, wherein said sign panel comprises one of a set of modular sizes so that various configurations are possible.

24. The signage system of claim 21, wherein said horizontal widths of each said retaining bracket, said upper panel, and said lower panel is less than a width between said two vertical supports, thereby allowing a larger panel to be inserted alongside said upper panel, said lower panel and said retaining bracket.

25. The signage system of claim 18, wherein said stops comprise an edge piece connected to said upper end and lower end of said core piece and wherein a width of said edge piece is equal to a width of said channels.

26. The signage system of claim 18, wherein said upper rails and said lower rails are fixedly connected to said vertical posts.

27. The signage system of claim 18, wherein said upper rail and said lower rail are fixedly connected to said vertical supports via threaded connectors.

28. A signage system, comprising:

two laterally spaced vertical supports;

an upper rail having first and second ends;

a lower rail having first and second ends, said upper rail and said lower rail each having confrontingly opposed longitudinal channels running substantially between said first and second ends thereof, each of said confrontingly opposed longitudinal channels having a longitudinal central portion and longitudinal side portions;

said upper and lower rails being mounted between said two vertical supports;

a substantially planar core piece having a first planar side and a second planar side and having upper and lower edges being mounted between said upper and lower rails in said central portions of said confrontingly opposed longitudinal channels;

said longitudinal channels having stops between said central portion and said side portions so that said upper and lower edges of said core are retained in said central portions of said longitudinal channels; and a sign panel having an upper edge and a lower edge being receivable in said side portions of said longitudinal channels on one of said first planar side and said second planar side of said core piece, said signage system thereby accommodating signage on said first planar side, said second planar side, and both of said fist and second planar sides of said core piece, wherein said supports are anchored into one of the ground beneath said signage system and a substantially vertical wall.

29. The signage system of claim 28, wherein said central longitudinial portion of each of said longitudinal channels comprises a first depth and said side portion comprises a second depth, wherein said first depth is greater than said second depth so that said stops comprise sides of said central longitudinal portion.

30. The signage system of claim 28, wherein said stops comprise barriers between said central longitudinal portion and said side portions of said longitudinal channels.

31. The signage system of claim 28, further comprising a retaining bracket fixedly connectable to said first planar side of said core, said retaining bracket forming channels with said core confrontingly opposed to said side portions of said longitudinal channels of said upper rail and said lower rail on said first planar side of said core, wherein said sign panel comprises an upper panel and a lower panel and said upper panel is held in said side portion of said upper rail and an upper channel of said retaining bracket and a second panel of said two panels is held in said side portion of said lower rail and a lower channel of said retaining bracket.

32. The signage system of claim 31, wherein said retaining bracket comprises an inner side facing said core piece and an outer side, said inner side having a continuous channel for receiving a connector element at any location therein, wherein said connector element holds said retaining bracket onto said core piece.

33. The signage system of claim 31, wherein said sign panel comprises one of a set of modular sizes so that various configurations are possible.

34. The signage system of claim 31, wherein said horizontal widths of each said retaining bracket, said upper panel, and said lower panel is less than a width between said two vertical supports, thereby allowing a larger panel to be inserted alongside said upper panel, said lower panel and said retaining bracket.

35. The signage system of claim 28, wherein said stops comprise an edge piece connected to said upper end and lower end of said core piece and wherein a width of said edge piece is equal to a width of said channels.

36. The signage system of claim 28, wherein said upper rails and said lower rails are fixedly connected to said vertical posts.

37. The signage system of claim 28, wherein said upper rail and said lower rail are fixedly connected to said vertical supports via threaded connectors.

38. A signage system, comprising:

two laterally spaced vertical supports;

an upper rail having first and second ends;

a lower rail having first and second ends, said upper rail and said lower rail each having confrontingly opposed longitudinal channels running substantially between said first and second ends thereof, each of said confrontingly opposed longitudinal channels having a longitudinal central portion and longitudinal side portions on either side of said longitudinal central portions;

said first ends of said upper and lower rails fixedly connected to one of said two vertical supports and said second ends of said upper and lower rails fixedly connected to the other of said two vertical supports such that said upper and lower rails are connected to said two vertical supports by a fixed connection;

a substantially planar core piece having a first planar side and a second planar side and having upper and lower edges releasably received in said central portions of said confrontingly opposed longitudinal channels, wherein said upper and lower edges of said core piece are held in said longitudinal channels by the fixed connection of said upper and lower rails to said vertical supports;

said longitudinal channels having stops between said longitudinal central portion and said longitudinal side portions so that said upper and lower edges of said core are retained in said central portions of said longitudinal channels;

a sign panel having an upper edge and a lower edge being receivable in said side portions of said confrontinigly opposed longitudinal channels on one of said first planar side and said second planar side of said core piece, said signage system thereby accommodating sign panels on said first planar side, said second planar side, and both of said first and second planar sides of said core piece; and a retaining bracket connectable to said core for one of supporting said sign panel between said retaining bracket and said upper rail and supporting said sign panel between said retaining bracket and said lower rail, wherein said core comprises a support system between said upper rail and said lower rail so that at least two rows of sign panels are supportable between said upper rail and said lower rail.

39. The signage system of claim 38, wherein said sign panel comprises an upper panel and a lower panel and said retaining bracket forms channels with said core confrontingly opposed to said side channels of said upper rail and said lower rail on said first planar side of said core, wherein said upper panel is held in said side portion of said upper rail and an upper channel of said retaining bracket and said lower panel is held in said side portion of said lower rail and a lower channel of said retaining bracket.

40. The signage system of claim 38, wherein said upper rail and said lower rail are fixedly connected to said vertical supports via threaded connectors.

* * * * *